United States Patent
Baillargeon

(10) Patent No.: US 10,897,785 B2
(45) Date of Patent: Jan. 19, 2021

(54) METHOD AND SYSTEM FOR GENERAL PACKET RADIO SERVICE TUNNELING PROTOCOL (GTP) PROBING

(71) Applicant: Steve Baillargeon, Gatineau (CA)

(72) Inventor: Steve Baillargeon, Gatineau (CA)

(73) Assignee: Telefonaktiebolaget Ericsson LM (publ), Stockholm (SE)

( * ) Notice: Subject to any disclaimer, the term of this patent is extended or adjusted under 35 U.S.C. 154(b) by 169 days.

(21) Appl. No.: 15/775,656

(22) PCT Filed: Nov. 12, 2015

(86) PCT No.: PCT/IB2015/058761
§ 371 (c)(1),
(2) Date: May 11, 2018

(87) PCT Pub. No.: WO2017/081518
PCT Pub. Date: May 18, 2017

(65) Prior Publication Data
US 2018/0338338 A1    Nov. 22, 2018

(51) Int. Cl.
*H04W 76/12* (2018.01)
*H04L 12/26* (2006.01)
*H04L 12/24* (2006.01)

(52) U.S. Cl.
CPC ......... *H04W 76/12* (2018.02); *H04L 41/5038* (2013.01); *H04L 43/103* (2013.01); *H04L 43/12* (2013.01)

(58) Field of Classification Search
CPC ..... G06F 3/0237; H04L 43/026; H04L 43/12; H04L 63/1408
See application file for complete search history.

(56) References Cited

U.S. PATENT DOCUMENTS

| | | | | |
|---|---|---|---|---|
| 2013/0088983 A1* | 4/2013 | Pragada | ............... | H04W 16/14 370/252 |
| 2014/0086068 A1* | 3/2014 | Borsos | ............... | H04L 12/4633 370/248 |
| 2015/0131435 A1 | 5/2015 | Kasslin et al. | | |

FOREIGN PATENT DOCUMENTS

EP    2648441    10/2013

OTHER PUBLICATIONS

Sager, Bernard, International Search Report, PCT/IB2015/058761, EPO, The Netherlands, dated Jul. 1, 2016.
(Continued)

*Primary Examiner* — Yemane Mesfin
*Assistant Examiner* — Mon Cheri S Davenport
(74) *Attorney, Agent, or Firm* — Ericsson Canada Inc.

(57) ABSTRACT

Methods and systems for probing General Packet Radio System (GPRS) Tunneling Protocol (GTP) links in a communication network are disclosed. According to principles described herein, originator and responder nodes (endpoints) are configured to use a probing interval that can be changed dynamically to adapt the probing frequency to the prevailing conditions measured and/or capabilities available at the originator and/or the responder. According to a broad aspect, a method for a network node includes receiving a probing request message originating from a first peer node via a GTP link, the probing request message containing a request indication for a probing interval recommendation for probing the GTP link, in response to the probing request message received, determining a probing interval recommendation for probing the GTP link and sending a probing response message to the first peer node via the GTP link, the probing response message containing the probing interval recommendation determined.

19 Claims, 8 Drawing Sheets

(56) References Cited

OTHER PUBLICATIONS

Sager, Bernard, Communication pursuant to Art.94(3) EPC, European Patent Office, Rijswijk, The Netherlands, dated Aug. 5, 2019.

* cited by examiner

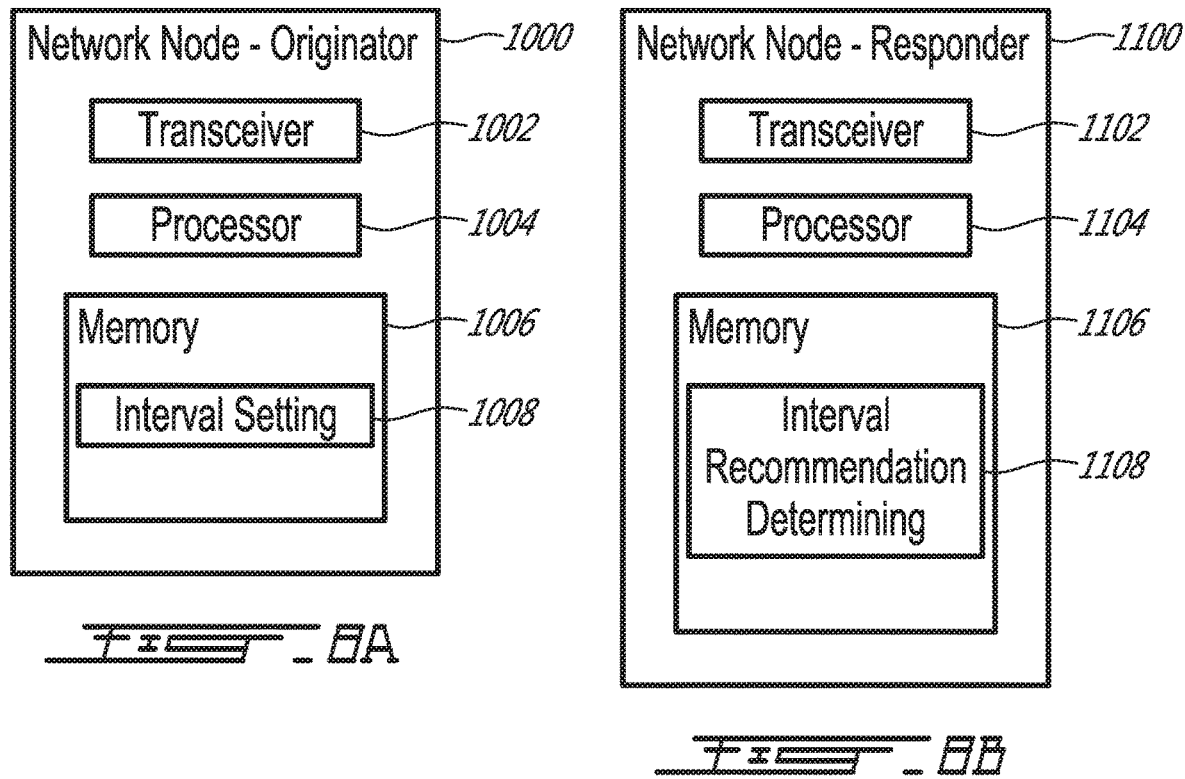
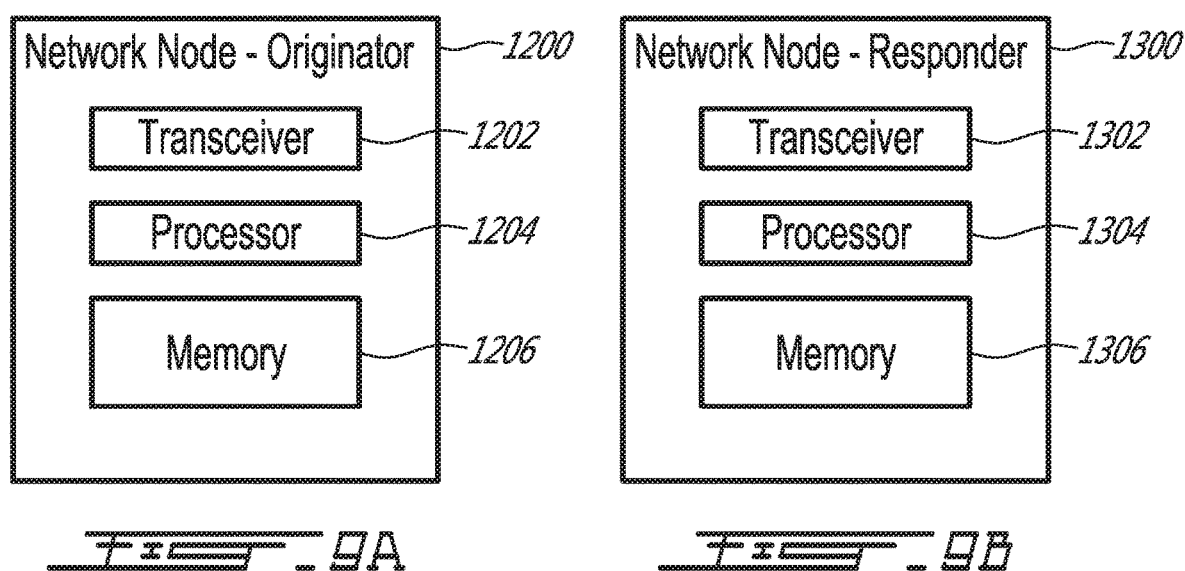

METHOD AND SYSTEM FOR GENERAL PACKET RADIO SERVICE TUNNELING PROTOCOL (GTP) PROBING

TECHNICAL FIELD

The present invention relates generally to a General Packet Radio System (GPRS) Tunneling Protocol (GTP) performance monitoring and more particularly to the probing of GTP links in a network.

BACKGROUND

The General Packet Radio Service (GPRS) is a packet oriented mobile data service for cellular communications systems, such as Global System for Mobile communications (GSM), Wideband Code Division Multiple Access (WCDMA), Universal Mobile Telecommunications System UMTS, LTE-Advanced (LTE-A) or other $4^{th}$ Generation (4G)) networks. Typically, in these types of communication networks, the GPRS Tunneling Protocol (GTP) which allows the creation of GTP-U tunnels is used to carry user data traffic between nodes. GTP-U is an Internet Protocol (IP) based communication protocol and, like other GTP protocols, runs over User Datagram Protocol (UDP) and IP transport layers. The control plane procedures to setup a GTP-U tunnel are defined in protocols such as GTP-C (another GTP protocol), as well as the Radio Access Network Application Part (RANAP), S1-Application Protocol (S1-AP), X2 Application Protocol (X2-AP) and M3 Application Protocol (M3AP).

As is well-known, a GTP-U node can support one or more GTP-U endpoints where each pair of GTP-U endpoints defines a GTP-U path or link which itself may carry multiple GTP-U tunnels. GTP-U tunnels carry GTP-U data packets (also known as G-PDUs) between the GTP-U tunnel endpoints. A tunnel endpoint is identified by a tunnel identifier, e.g., a Tunnel Endpoint IDentifier (TEID).

In addition to carrying GTP-U data packets, each pair of GTP-U endpoints can also exchange GTP-U signaling messages for user plane path management or for user plane tunnel management. An example of path management messages are GTP-U echo request and response messages. These messages can be used by a GTP-U endpoint to determine if peer GTP endpoints are alive and/or reachable. Typically, if a peer endpoint does not respond after a specific number of echo request messages, the peer endpoint is declared down and all of the tunnels associated with the peer endpoint are taken down. In conventional radio networks, echo messages are used to manage GTP paths established over an S1-U interface between an eNodeB (eNB) and a Serving Gateway (S-GW) but not over X2-U interfaces between eNBs and M1 interfaces between Multimedia Broadcast and Multicast Services Gateway (MBMS-GW) and eNBs.

Currently, the amount of traffic carried over existing X2-U connections (e.g. X2 handover or packet forwarded traffic) is relatively small and not usually delay sensitive. However, as new radio features are being introduced by network operators requiring greater coordination between eNBs but also between eNBs and Core Network (CN) nodes and networks, the traffic over X2-U unicast, S1-U unicast and M1 multicast connections and other Internet Protocol (IP) based interfaces will undoubtedly increase. Such features, for example, Carrier Aggregation, Coordinated Multi-Point (CoMP) transmission/reception schemes and Cloud Radio Access Network (C-RAN) will also impose tighter delay and/or latency requirements on X2-U connections. Future evolutions of 4G or $5^{th}$ Generation (5G) networks are also envisioned to embrace a split baseband architecture where LTE baseband protocols (e.g. Packet Data Convergence Protocol (PDCP), Radio Link Control (RLC), Medium Access Control (MAC)) will run over interconnected IP nodes or interfaces supporting the GTP-U protocol but with very low delay requirements there between.

In light of the above, knowledge of GTP link and/or tunnel performance capabilities may help new radio feature deployment and inform network traffic engineering, management and fault diagnosis functions to ensure that requirements specified for connections between nodes or endpoints in a network are met and/or maintained. In other words, there is a need for probing links to help ensure that the network can provide the Quality of Service (QoS) required.

Active IP probe based sampling of the IP path carrying the GTP-U tunneled traffic is currently used as a methodology for estimating the end-to-end state and performance of unicast and multicast subscriber connections across an IP network. Examples of active IP probing techniques include the One-Way Active Measurement Protocol (OWAMP) and the Two-Way Active Measurement Protocol (TWAMP) both developed by the Internet engineering task force (IETF) standard body and described in Request for Comments (RFC) documents 5357 and 4656 hereby incorporated by reference in their entirety.

However, wireless network operators wanting to deploy these types of IP test protocols must often purchase and manage additional equipment, separate from the equipment normally required to establish their networks. Even when the equipment and functionality can be integrated into certain nodes (e.g. eNBs, S-GWs and MBMS-GW), the test protocols requires the configuration of an extensive set of parameters (e.g. IP addresses, UDP ports, IP QoS, test modes, etc.) before any IP test connection can be established and in many instances, the configuration is static and does not change for the duration of a test connection. In addition, statically configuring parameters and correlating IP test connections to nodes in a radio network can become a very onerous task, particularly as the number of IP connections and nodes in the network becomes large. Accordingly, there is a need for an improved probing technique.

SUMMARY

Methods and systems for enabling the collection of end to end performance information of General Packet Radio System (GPRS) Tunneling Protocol (GTP) links in a communication network are disclosed. According to principles described herein, originator and responder nodes/endpoints are configured for probing GTP links using a probing interval that can be changed dynamically to adapt the probing frequency to the prevailing conditions measured and/or capabilities available at either the originator or the responder node. In some implementations, a dynamic probing interval may be useful where, for example, the originator and/or the responder is subject to performance variations (e.g. throughput or load) either at the link level or at the node level. By dynamically adjusting the probing interval, it may be possible for nodes/endpoints to adapt their ability to probe based on current conditions and/or capabilities and hence optimize the probing such that the interference with each node's performance is reduced or minimized.

According to a broad aspect, there is provided a method for a network node for probing GTP links operable to carry data traffic between the network node and peer nodes in a communication network. The method includes at the network node receiving a probing request message originating from a first peer node via a GTP link where the probing request message contains a request indication for a probing interval recommendation for probing the GTP link. The method also includes in response to the probing request message received, determining a probing interval recommendation for probing the GTP link. The method also includes sending a probing response message to the first peer node via the GTP link where the probing response message contains the probing interval recommendation.

In some embodiments, sending a probing response message includes sending a number of successive probing response messages to the first peer node where each successive probing response message contains the probing interval recommendation determined. In other embodiments, the probing response message contains at least one parameter associated with one of the probing request message, the probing response message and the GTP link.

In yet other embodiments, the probing interval recommendation is a current probing interval and the method further includes receiving a subsequent probing request message originating from the first peer node via the GTP link where the subsequent probing request message contains a request indication for a probing interval recommendation for probing the GTP link. In these embodiments, in response to the subsequent probing request message received, the method further includes determining a subsequent probing interval recommendation for probing the GTP link where the second probing interval recommendation is different from the current probing interval. The method also includes sending a subsequent probing response message to the first peer node via the GTP link where the subsequent probing response contains the subsequent probing interval recommendation. In yet other embodiments, the method further includes repeating the acts of receiving, determining and sending for each of a plurality of probing request messages received from the first peer node.

In yet other embodiments, the probing interval recommendation is a first probing interval recommendation and the GTP link is a first GTP link, and the method further includes receiving a probing request message originating from a second peer node via a second GTP link where the probing request message from the second peer node contains a request indication for a probing interval recommendation for probing the second GTP link. In these embodiments, the method further includes in response to the probing request received from the second peer node, determining a second probing interval recommendation for probing the second GTP link where the second probing interval recommendation is determined independently of the first probing interval recommendation. The method further includes sending a probing response message to the second peer node via the second GTP link where the probing response message for the second peer node contains the second probing interval recommendation. In yet other embodiments, the method further includes repeating the acts of receiving, determining and sending for probing the second GTP link with the second peer node for each of a plurality of probing request messages received from the second peer node.

In yet other embodiments, determining a probing interval recommendation for probing the GTP link includes determining a probing interval recommendation based on at least one of a condition at the network node and a capability of the network node. In yet other embodiments, determining a probing interval recommendation for probing the GTP link includes determining a probing interval recommendation based on least one of a capability of the network node, a congestion level at the network node, a number of probe messages processed at the network node, a CPU utilization level at the network node, a traffic level for the GTP link, a type for the GTP link, and a number of current GTP links at the network node. In yet other embodiments, the GTP link comprises one of a GTP path, one or more GTP tunnels, one or more GTP-U tunnels and one or more GTP-C tunnels.

In yet other embodiments, the probing request message includes a GTP-U Echo request and the probing response message includes a GTP-U Echo response and wherein the probing interval recommendation is included in one of an Information Element and a private extension of the GTP-U Echo response. In yet other embodiments, the probing request message includes a TWAMP Session-Sender test packet and the probing response message includes a TWAMP Session-Reflector test packet and wherein the probing interval recommendation is included in a field of the TWAMP Session-Reflector packet.

In yet other embodiments, the request indication for a probing interval recommendation for probing the GTP link includes one of a flag, a private extension, a current probing interval value, a current probing method value, and a probing interval Information Element. In yet other embodiments, the probing interval recommendation includes one of a probing interval value and a probing method value indicative of a probing interval value.

In another broad aspect, there is provided another method for a network node for probing GTP links operable to carry data traffic between the network node and peer nodes in a communication network. The method includes at the network node sending a probing request message to a first peer node via a GTP link where the probing request message contains a request indication for a probing interval recommendation for probing the GTP link. The method further includes receiving a probing response message from the first peer node via the GTP link where the probing response message contains a probing interval recommendation determined by the first peer node.

In some implementations, the method further includes setting a probing interval for the GTP link based on the probing interval recommendation determined by the first peer node. In other embodiments, the method further includes setting a probing interval for the GTP link based on the probing interval recommendation determined by the first peer node and at least one of a condition at the network node and a capability of the network node. In yet other embodiments, the method further includes setting a probing interval for the GTP link based on the probing interval recommendation determined by the first peer node and at least one of a capability of the network node, a congestion level at the network node, a number of probe messages processed at the network node, a CPU utilization level at the network node, a traffic level for the GTP link, a type for the GTP link, and a number of current GTP links at the network node.

In some implementations, the method further includes sending a subsequent probing request message to the first peer node via the GTP link at a time based on the probing interval set. In other implementations, the method further includes sending a subsequent probing request message to the first peer node via the GTP link at a time based on the probing interval set, after receiving a number of successive probing response messages from the first peer node. In other implementations, the probing response message contains at least one parameter associated with one of the probing request message, the probing response message and the GTP link.

In yet other implementations, the probing interval recommendation contained in the probing response message is a first probing interval recommendation and the method further includes sending a subsequent probing request message to the first peer node via the GTP link where the subsequent probing request message contains a request indication for a probing interval recommendation for probing the GTP link. In those implementations, the method further includes receiving a subsequent probing response message from the first peer node via the GTP link where the subsequent probing response message contains a subsequent probing interval recommendation determined by the first peer node and different from the first probing interval recommendation. In yet other implementations, the method further includes repeating the acts of sending a probing request message to the first peer node and receiving a probing response message from the first peer node based on the probing interval recommendation contained in the probing response message.

In yet other implementations, the probing interval recommendation contained in the probing response message is a first probing interval recommendation and the GTP link is a first GTP link and the method further includes sending a probing request message to a second peer node via a second GTP link wherein the probing request message to the second peer node contains a request indication for a probing interval recommendation for probing the second GTP link. The method further includes receiving a probing response message from the second peer node via the second GTP link where the probing response message from the second peer node contains a second probing interval recommendation determined by the second peer node independently of the first probing interval recommendation. In yet other implementations, the method further includes repeating the acts of sending and receiving for probing the second GTP link with the second peer node based on the second probing interval recommendation.

In yet other implementations, the probing interval recommendation is determined based on at least one of a capability of the first peer node, a congestion level at the first peer node, a number of probe messages processed at the first peer node, a CPU utilization level at the first peer node, a traffic level for the GTP link, a type for the GTP link, and a number of current GTP links at the first peer node. In yet other implementations, the GTP link comprises one of a GTP path, one or more GTP tunnels, one or more GTP-U tunnels and one or more GTP-C tunnels. In yet other implementations, the probing request message includes a GTP-U Echo request and the probing response message includes a GTP-U Echo response and wherein the probing interval recommendation determined is included in one of an Information Element and a private extension of the GTP-U Echo response. In yet other implementations, the probing request message includes a TWAMP Session-Sender test packet and the probing response message includes a TWAMP Session-Reflector test packet and wherein the probing interval recommendation determined is included in a field of the TWAMP Session-Reflector packet. In yet other implementations, the request indication for a probing interval recommendation for probing the GTP link includes one of a flag, a private extension, current probing interval value, a current probing method value, and a probing interval Information Element. In yet other implementations, the probing interval recommendation determined includes one of a probing interval value and a probing method value indicative of a probing interval value.

In another broad aspect, there is provided a network node configured to probe GTP links operable to carry data traffic between the network node and peer nodes in a communication network, where the network node includes circuitry containing instructions which, when executed, cause the network node to perform any of the method embodiments described above. In some embodiments, the network node includes a radio access node (e.g. an eNodeB or Wireless Local Access Network (WLAN Access Point), an S-GW node or MBMS-GW node.

In yet another broad aspect, there is provided a non-transitory computer readable memory configured to store executable instructions for a network node and where the network node is configured to probe GTP links operable to carry data traffic between the network node and peer nodes in a communication network, and where the executable instructions when executed by a processor cause the network node to implement any of the above method embodiments described above.

In yet another broad aspect, there is provided a network node configured to probe GTP links operable to carry data traffic between the network node and peer nodes in a communication network, where the network node includes a receiver for receiving a probing request message originating from a first peer node via a GTP link where the probing request message contains a request indication for a probing interval recommendation for probing the GTP link. The network node also includes an interval recommendation determining module for determining a probing interval recommendation for probing the GTP link in response to the probing request message received. The network node also includes a transmitter for sending a probing response message to the first peer node via the GTP link where the probing response message contains the probing interval recommendation determined.

In yet another broad aspect, there is provided a network node configured to probe GTP links operable to carry data traffic between the network node and peer nodes in a communication network, where the network node includes a transmitter for sending a probing request message to a first peer node via a GTP link, where the probing request message contains a request indication for a probing interval recommendation for probing the GTP link. The network node also includes a receiver for receiving a probing response message from the first peer node via the GTP link, where the probing response message contains the probing interval recommendation determined by the first peer node. In some implementations, the network node also includes an interval setting module for setting a current probing interval based on the probing interval recommendation determined by the first peer node.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein:

FIG. 8A-8B shows a block diagram of exemplary embodiments of network nodes configured as originator and responder in accordance with principles of the present disclosure; and FIG. 9A-9B shows a block diagram of other exemplary embodiments of network nodes configured as originator and responder in accordance with principles of the present disclosure.

DETAILED DESCRIPTION

Figure 1:
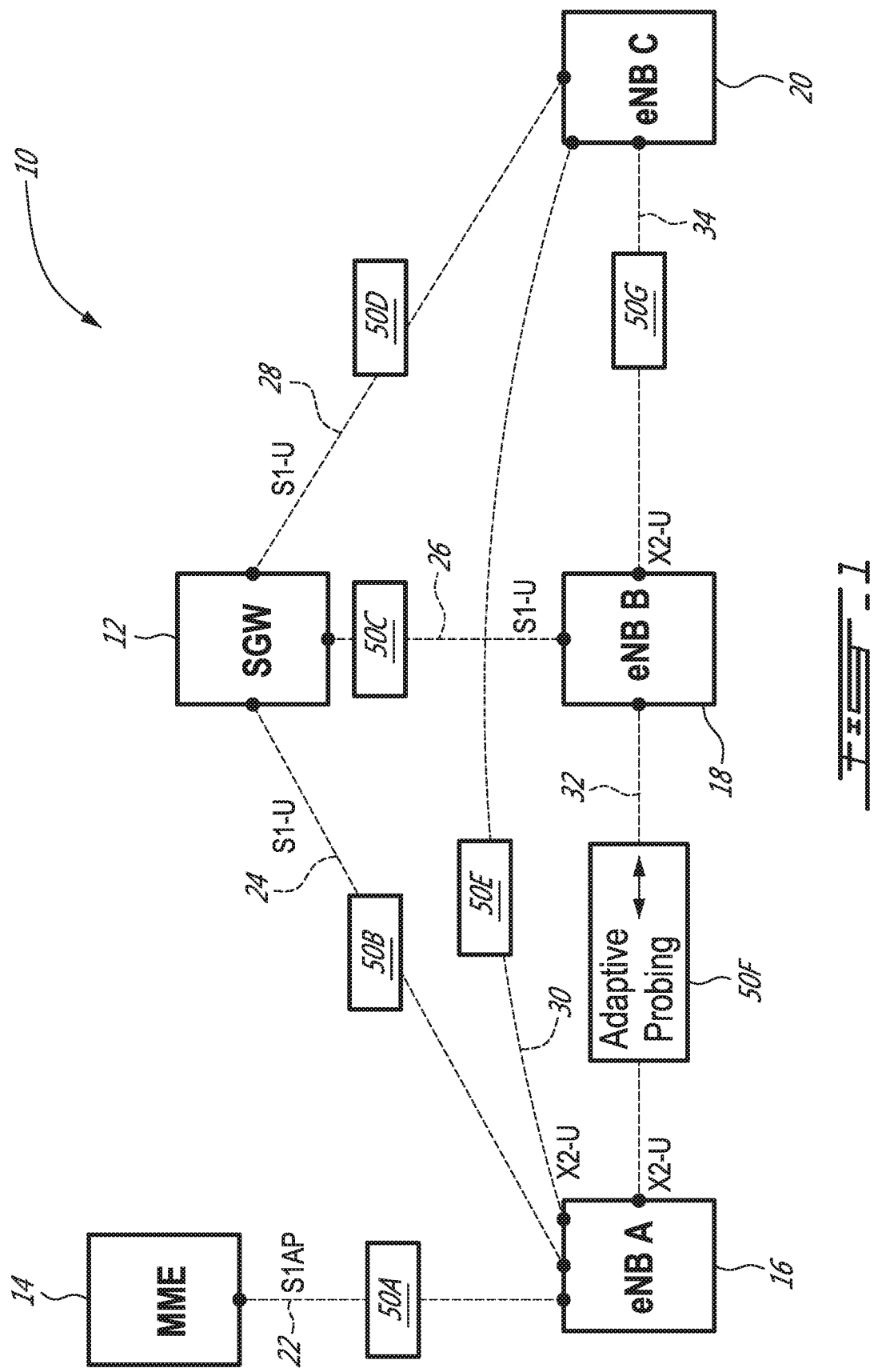
FIG. 1 illustrates an example of a Long Term Evolution (LTE) network in which nodes are configured to probe General Packet Radio System (GPRS) Tunneling Protocol (GTP) links using probing request and response messages, in accordance with the principles described herein.

Before describing in detail exemplary embodiments, it is noted that the embodiments reside primarily in combinations of apparatus components and processing steps related to the probing of links in a communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein illustrate probing methods and systems to enable the collection of end-to-end performance information for General Packet Radio System (GPRS) Tunneling Protocol (GTP) links established in a communication network for administrative, troubleshooting, quality-of-service (QoS) monitoring, user traffic profiling, planning, Internet Protocol (IP) bandwidth on demand, and radio feature activation purposes. As such, the following description generally applies to the probing of GTP links between an originator node (or endpoint) and a responder node (or endpoint). In some implementations, a GTP link includes one or more (e.g. a set of) GTP tunnels. In other implementations, a GTP link includes a path (e.g. a connection-less unidirectional or bidirectional path used to multiplex GTP tunnels and defined by two endpoints (e.g. themselves each defined by an IP address and a UDP port number). Depending on whether any GTP tunnel has been established, it is possible that a GTP path may or may not have any GTP tunnels associated therewith at any given time. Examples of GTP links include GTP-U tunnels and paths for user data traffic as well as GTP-C tunnels and paths for signaling traffic. In yet other implementations, a GTP link may be a unicast or multicast path or tunnel. Generally however, it is to be understood that the principles described therein also apply to the probing of any link capable or configured to use probing request/response messages as described herein. For clarity, the following examples are in relation to the probing of GTP links.

In addition, the examples and embodiments provided below describe how nodes or endpoints in a cellular or radio communication network such as a Long Term Evolution (LTE) network can be configured for link probing. However, those having ordinary skill in the relevant art will readily appreciate that the principles described herein may equally apply to other types of networks. For example, the radio communication network may also include other $3^{rd}$ Generation Partnership Project (3GPP) networks (e.g. Universal Mobile Telecommunications System UMTS, LTE-Advanced (LTE-A)), LTE-Unlicensed (LTE-U), $4^{th}$ Generation (4G), $5^{th}$ Generation (5G) or other future generations of a 3GPP communication network infrastructure as well as other types of wireless communication networks such as Wireless Local Access Networks (WLANs). More generally, the radio communication network may include any current or future wireless access and core network infrastructure with nodes and/or endpoints adapted to or configured for probing GTP links using a probing request/response mechanism.

Referring now to FIG. 1, there is shown an example of a LTE network 10 in which access nodes 16, 18, 20 and Core Network (CN) nodes 12, 14 are configured to probe links 22, 26, 28, 30, 32, 34 using a dynamic or adaptive probing request/response mechanism 50A-G configured in accordance with principles described herein (further details below). Generally, the LTE network 10 may include additional and/or different access and/or Core Network (CN) nodes connected via GTP links but for clarity, the LTE network in the example of FIG. 1 is shown to include only three access nodes (i.e. evolved NodeB (eNB)) 16, 18, 20 and two CN nodes which in this case are a Serving Gateway (S-GW) 12 and a Mobility management Entity (MME) 14. However, it is understood that other network configurations for the LTE network 10 are possible including configurations with MBMS SW and/or WLAN (e.g. Wi-Fi) nodes or Access Points (APs).

In the LTE network 10 of FIG. 1, the eNBs 16, 18, 20 and the S-GW 12 are interconnected with GTP-U links 50B-G while the MME 14 is connected with each eNB 16, 18, 20 via IP-based link 22 (only one connection shown). Data traffic between the eNBs 16, 18, 20 is sent over GTP-U links 30, 32, 34 while traffic between each eNB 16, 18, 20 and the S-GW 12 is sent over the S1-U interface also via GTP-U links 24, 26, 28. Link 22 carries S1-AP signalling messages between the eNBs 16, 18, 20 and the MME 14. Each access nodes 16, 18, 20 is an eNB but in other implementations, the access nodes 16, 18, 20 may each be a Node B (NB), base station, base station controller (BSC), radio network controller (RNC), relay, donor node controlling relay, base transceiver station (BTS), transmission point, transmission node, remote RF unit (RRU), remote radio head (RRH), a node in a distributed antenna system (DAS), or a memory management unit (MMU). Generally, the access node 16, 18, 20 is configured to probe links 22, 24, 26, 28, 30, 32, 34 with peer nodes or endpoints but other nodes in the LTE network RAN 10 or in a network outside of the RAN/CN infrastructure (e.g. an Internet Protocol (IP) node in an IP network) may be configured for that purpose. It is to be understood that the functionality described herein in relation probing GTP links may also equally apply to any node or endpoint terminating a link as shown and/or described.

According to principles described herein, each of the nodes 12, 14, 16, 18, 20 in the LTE network of FIG. 1 is configured to probe the links it terminates with a probing request/response mechanism 50A-G that uses a dynamic probing interval (further details below). Depending on the implementation, the nodes 12, 14, 16, 18, 20 are each configured either as an originator (to send probing requests), as a responder (to respond to probing requests) or as both.

Figure 2:
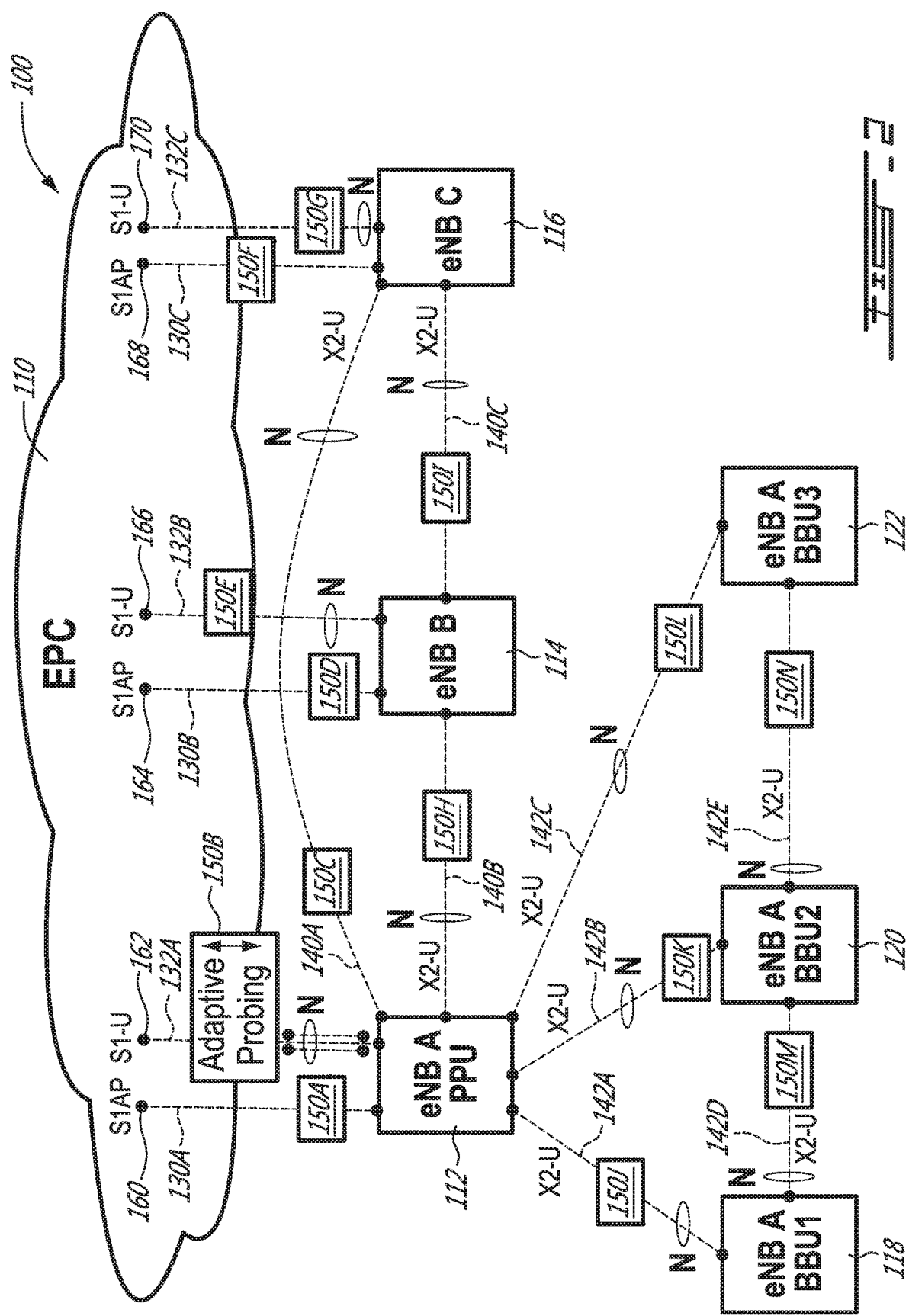
FIG. 2 illustrates an example of another LTE network in which nodes are configured to probe GTP links using probing request and response messages, in accordance with the principles described herein.

Referring now to FIG. 2, there is shown an example of another LTE network 100 in which nodes and endpoints are configured to probe links with a dynamic probing request/response mechanism 150A-N in accordance with principles described herein. Specifically, the LTE network 100 includes a number of eNBs 112, 114, 116, 118, 120, 122 and core network functionality (e.g. MBMS-GW, S-GW and/or MME functionality) implemented in cloud computing infrastructure 110 which itself may include one or more servers, nodes, blades, I/O interfaces and/or processing or control circuitry configured to implement such functionality in the same or multiple different locations. The eNBs 112, 114, 116 are configured to interact with such core network functionality via links 130A-C to endpoints 160, 164, 168 and GTP links 132A-C to endpoints 162, 164, 170. In the example of FIG. 2, endpoints 160, 164 and 168 are configured to provide MME functionality while endpoints 162, 166, 170 implement S-GW functionality.

In the example of FIG. 2, eNB 112 is configured with a split layer architecture where some of the layer functionality, for example PDPC packet processing, is performed by one central eNB node or unit 112 (e.g. a Packet Data Convergence Protocol (PDCP) Packet Unit (PPU)) and other layer functionality for example Media Access Control (MAC)/Physical (PHY) processing, is located in one or more Baseband Unit (BBU) eNBs 118, 120, 122 serving different cells. In the example of FIG. 2, the PPU eNB 112 is configured with (internal) GTP links 142A-C to its associated BBU eNBs 118, 120, 122 and with (external) GTP links 140A-C to interconnect with other eNBs 114, 116 which may or may not have a split architecture. The BBU eNBs 118, 120, 122 are interconnected with one or more GTP links 142D, 142E. Data traffic between eNBs 112, 114, 116, 118, 120, 122 is sent over GTP-U links 140A-C, 142A-E via the X2-U interface while traffic between each eNB 112, 114, 116 and a respective S-GW endpoint 162, 166, 170 is sent over the S1-U interface via GTP-U links 132A-C. Links 160, 164, 168 carry S1-AP signalling messages between the eNBs 112, 114, 116 and a respective MME endpoint 160, 164, 168.

In accordance with principles described herein, each of the eNBs 112, 114, 116, 118, 120, 122 and endpoints 160, 162, 164, 166, 168, 170 in the LTE network of FIG. 2 is configured to probe links it terminates with a probing request/response mechanism 150A-150M that uses a dynamic probing interval (further details below). Depending on the implementation, the eNBs 112, 114, 116, 118, 120, 122 and endpoints 160, 162, 164, 166, 168, 170 are each configured either as an originator, as a responder or as both.

As will be explained below in greater detail, in some implementations, the probing interval in at any of the nodes or endpoints shown in the LTE networks 10, 100 of FIGS. 1, 2 can be changed dynamically to adapt the probing frequency to the prevailing conditions measured and/or capabilities available at either the originator node/endpoint or the responder node/endpoint. A dynamic probing interval may be useful in implementations where, for example, either the originator or the responder is subject to performance variations (e.g. throughput, load) either at the link level or at the node level. By dynamically adjusting the probing interval, it may be possible for nodes/endpoints to adapt their ability to probe based on current conditions and/or capabilities and hence optimize the probing such that interference with each node's performance is reduced or minimized.

In other implementations, the probing interval for a given link can be changed independently of probing interval used for other links. Referring back to the LTE network 10 of FIG. 1 for example, the eNB 16 might select a probing interval for GTP link 24 independently from the probing interval it might use for probing GTP links 30, 32. In yet other implementations, the probing interval is selected based on current conditions and/or capabilities of the responder. For example, if configured as originator, the eNB 16 might select a probing interval for probing GTP link 32 which is based on current conditions measured and/or capabilities available of eNB 18 while the probing interval for probing GTP link 24 is selected based current conditions and/or capabilities of the S-GW 12. This may generally be advantageous, in implementations where different responder nodes operate under different conditions and/or have capabilities which are different from those of the originator node. For example, in a network configured for inter-eNB carrier aggregation, the different types of eNBs used (e.g. macro/pico eNBs) might operate under different conditions and/or have different capabilities. In these implementations, an eNB configured as an originator node can advantageously tailor the probing of links with different responder nodes based on their respective ability to respond to probe requests.

Figure 3:
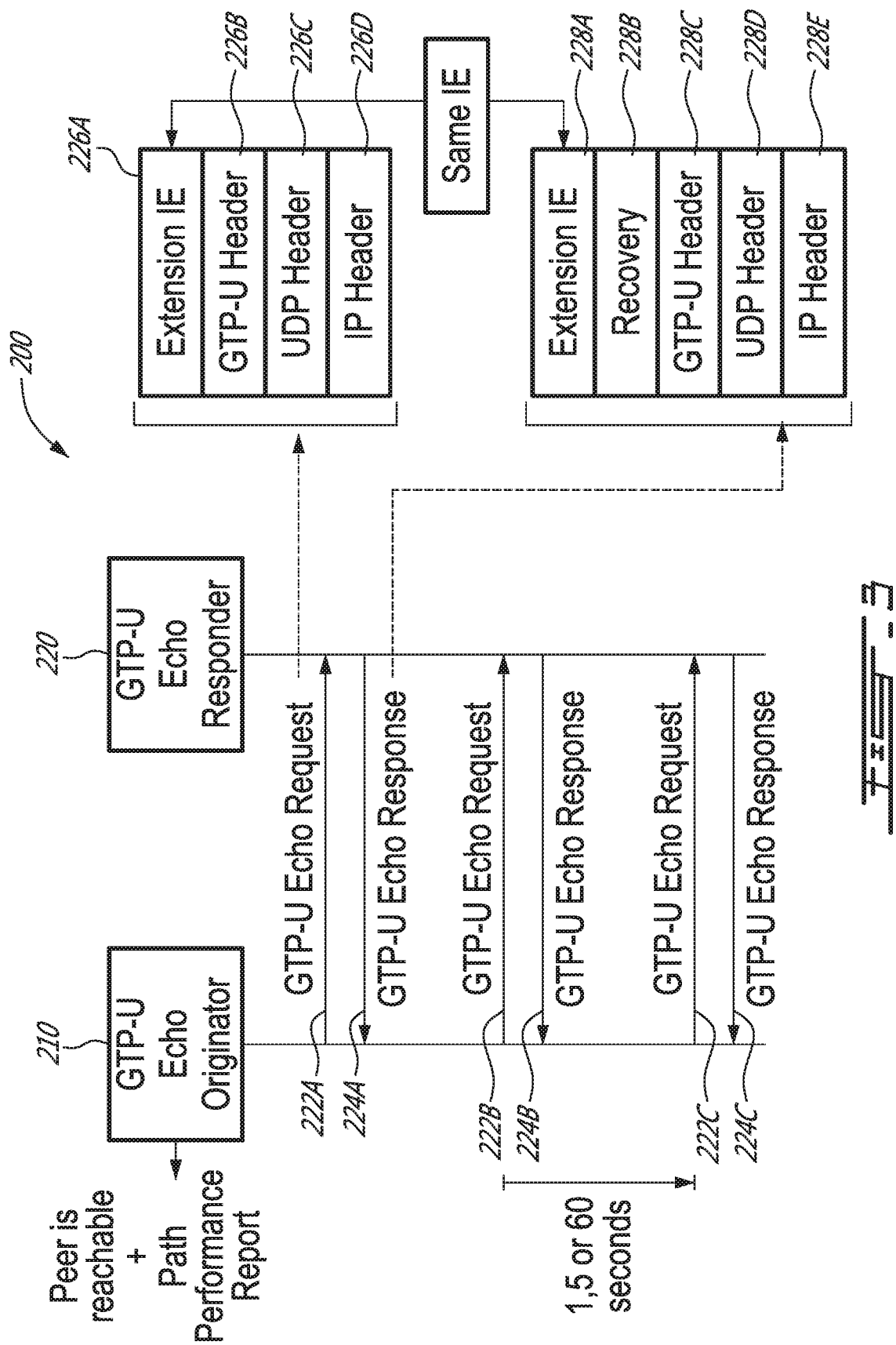
FIG. 3 is a signaling diagram example of a method for probing a GTP link in the LTE network of FIG. 1 or 2 established between a GTP-U echo originator and GTP-U echo responder, in accordance with the principles described herein.

Turning now to FIG. 3, there is shown a signaling diagram example 200 of a method for probing a GTP-U link between a GTP-U originator 210 and a GTP-U responder 220 which may be any node or endpoint configured to terminate a GTP-U link such as those shown in FIG. 1 or 2. In this example, the originator 210 is configured to probe the GTP-U link using GTP-U echo request messages 222A-C (only three shown) which it sends periodically to the responder 220. If the responder 220 receives an echo request message 222A-C, it sends a GTP-U response message 224A-C back to the originator 210 confirming it is active and reachable. GTP-U echo request and response messages 222A-C, 224A-C are examples of the probing request/response mechanisms described in relation to FIGS. 1 and 2. However, in other implementations, other types of GTP messages or other probing request/response messages could be used. For example, in implementations where the GTP-U link probed is a multicast link, the probing request message is a multicast probing request (e.g. a multicast echo request) sent to a plurality of responders 220 and the probing response message sent by each responder 220 is a unicast echo response message (e.g. a unicast echo response). In another example, the probing request message could be a Two-Way Active Measurement Protocol (TWAMP) Session-Sender test packet and the probing response message could be a TWAMP Session-Reflector test packet. Other possibilities exist for the probing request/response messages.

The GTP-U echo request 222A-C includes GTP, UDP and IP headers 226B-D while the GTP-U echo response includes a recovery field 228B as well as GTP, UDP and IP headers 228C-E. Based on measurement(s) contained in the echo requests 222A-C sent and responses 224A-C received, the originator 210 can determine (or have determined at a different node) performance metrics or Key Performance Indicators (KPIs) associated with the GTP link probed. Metric examples includes one-way (forward or reverse) or two-way delay metrics, packet delay variation metrics, packet loss metrics, misordering metrics, packet QoS marking metrics, originator/responder bitrate metrics, etc. In some embodiments, these metrics can be expressed in the form of a path or tunnel performance report. Other possibilities exit for producing one or more metrics based on the echo requests 222A-C and responses 224A-C.

According to principles of the present disclosure, the originator 210 is configured to send echo requests 222A-C using an adaptive probing interval (i.e. the time duration between two successive echo requests 222A-C). Depending on the conditions and/or capabilities currently prevailing at the responder 220, the originator 210 can change the probing interval dynamically so as to optimize the probing (e.g. without negatively impacting each node's performance). In the example of FIG. 3, the originator is configured to set the probing interval to a value of 1, 5 or 60 seconds. However, it is understood that different or additional interval values could be used. In some implementations, the probing interval is increased when a current performance condition and/or capability of the responder (e.g. a load) is greater than a predetermined performance value (e.g. set in a policy). In other implementations, the probing interval is decreased when the responder performance condition and/or capability is lower than the predetermined value. In yet other implementations, the probing interval is maintained when the current performance condition and/or capability is equal to or meets the predetermined performance value. In yet other implementations, the probing interval is gradually increased or decreased based whether the current performance condition and/or capability increases or decreases relative to a predetermined performance value. Generally, the probing interval is set such that the probing frequency can be adapted dynamically based on current conditions measured and/or capabilities available at either the originator or responder (further details below).

According to principles of the present disclosure, the originator 210 determines the appropriate probing interval based on a probing interval recommended by the responder 220 for probing the GTP-U link. In some implementations, the originator 210 includes a request indication for a probing interval recommendation in one or more echo request messages 222A-C. If an echo request message 222A-C contains a request for a probing interval recommendation, the responder 220 includes a recommended probing interval value in its echo response 224A-C. In implementations where the GTP-U link is a multicast link and the echo request message 222A-C is a multicast echo request, each responder 220 includes a recommended probing interval value in its unicast echo response 224A-C. Based on the value(s) recommended for probing the GTP-U link, the originator 210 sets its current probing interval to a new value which, in some cases, may be greater, lower or equal to the probing interval value currently used by the originator 210.

In some implementations, the request indication is a current probing interval value or another value indicative of a current probing interval value such as, for example, a probing method value, an Information Element (IE) value, a flag value or an index value. Other possibilities exist for request indication. In some implementations, the request indication for a probing interval recommendation is included in an extension 226A of the echo request message 222A-C.

In other implementations, the request indication may be included as a flag, an index, an IE, or another field of the echo request message 222A-C.

In some embodiments, when the responder 220 receives an echo request 222A-C containing a request indication for a probing interval recommendation, the responder 220 is configured to determine a suitable probing interval or method (e.g. based on its current conditions and/or capabilities), and send a corresponding probing interval recommendation in an echo response 224A-C. In some implementations, the probing interval recommendation is a probing interval value, or another value indicative of a particular probing interval value such as, for example, a probing method value, an Information Element (IE) value, a flag value or an index value. Other possibilities exist for probing interval recommendation. In some implementations, the probing interval recommendation is included in an extension 228A of the echo response message 224A-C. In other implementations, the probing interval recommendation may be included as a flag, an index, an Information Element or as another field of the echo response message 224A-C. In yet other implementations, the extension 228A and the extension 226A is the same IE and the probing interval recommendation is included is the same field in the IE used for the request indication.

Figure 4:
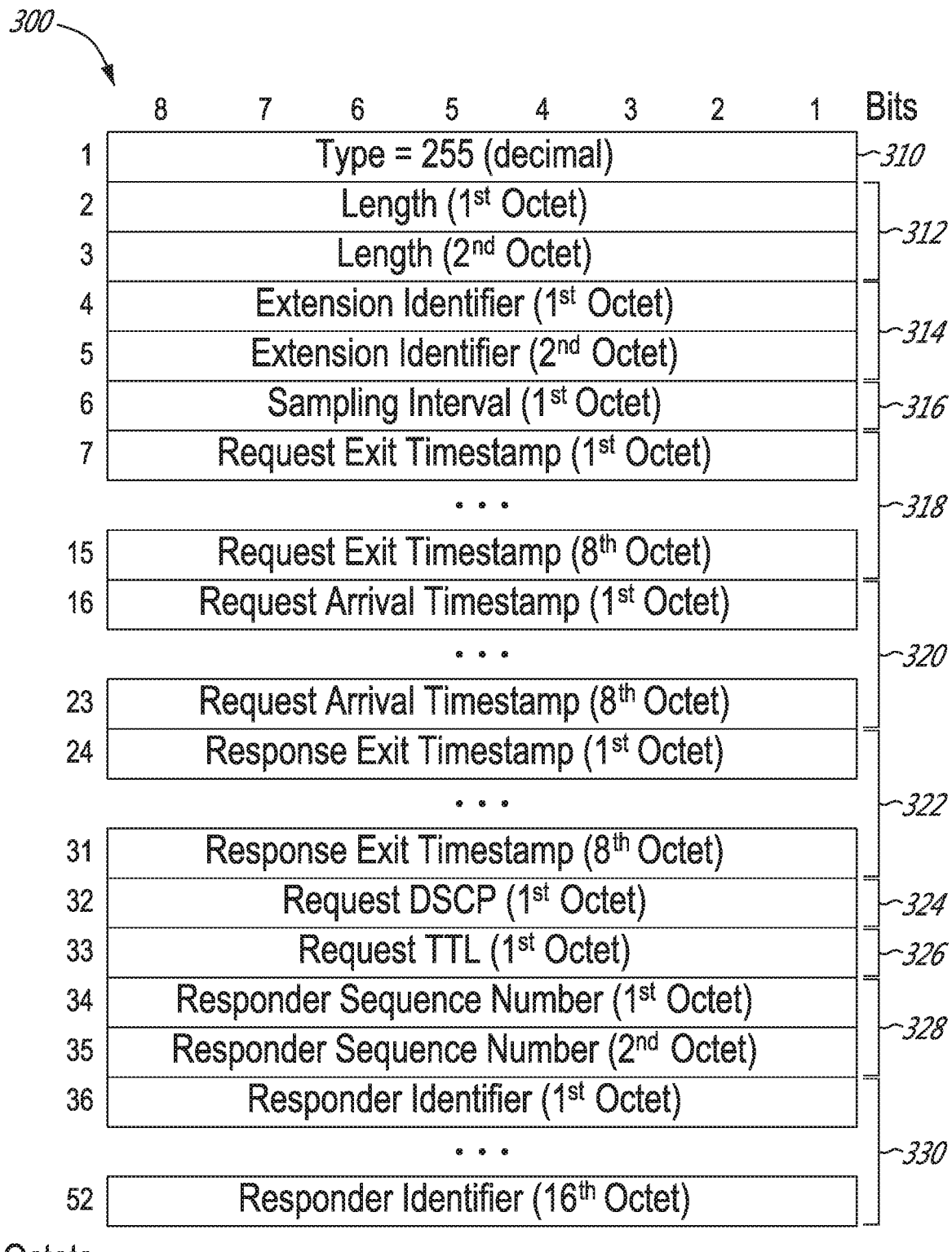
FIG. 4 is an example of an extension for the echo request and response messages of FIG. 3, in accordance with the principles described herein.

FIG. 4 is an example of an extension 300 for the echo request and response messages of FIG. 3 in accordance with principles described herein. In this example, the extension 300 is an IE that includes a sampling interval field 316 that can be used by the originator 210 in its echo request message(s) 222A-C to specify a request indication for a probing interval recommendation. The sampling interval field 316 can also be used by the responder 220 in its echo response message(s) 224A-C to specify a probing interval recommendation. In some implementations, the values specified in Table A below are used by the originator 210 to denote a current sampling interval or method and by the responder 220 to denote a recommended or preferred sampling interval/method.

TABLE A

| Value | Meaning |
| --- | --- |
| 0 | Slow periodic transmission (1 echo request per minute) |
| 1 | Fast periodic transmission (1 echo request per second) |
| 2-255 | Reserved |

In the echo request message 222A-C, the originator 210 uses the sampling interval field 316 both as a request indication to the responder 220 for a probing interval recommendation and as a way to indicate a probing interval recommendation method or value. For example, the originator 210 sets the sampling interval field 316 to a value of 0 to indicate to the responder 220 that the probing method it currently uses is one echo request per minute (60 second interval). The originator 210 can also set the sampling interval field to a value of 1 to indicate that the probing method it currently uses is one echo request per second (one second interval). In other implementations, different or additional values could be used for the request indication and/or to provide more or less possibilities for the different probing interval methods or values supported by the originator 210.

In the echo response message 224A-C, the responder 220 uses the sampling interval field 316 as a way to indicate a preferred or recommended probing interval method or value.

For example, the responder 220 sets the sampling interval field 316 to a value of zero to indicate to the originator 210 that its preferred probing method is one echo request per minute (60 second interval). The responder 220 can also set the sampling interval field 316 to a value of one to indicate that the probing method it prefers is one echo request per second (one second interval). In other implementations, the responder 220 sets the sampling interval field 316 to a default method value (e.g. one). In other implementations, different or additional values could be used to provide more or less possibilities for the different probing interval methods or values supported by the responder 220.

In the example of FIG. 4, the extension 300 also contains type and length fields 310, 312 as well as an extension identifier field which can be used to assist the responder 220 in determining whether it can or should read the extension 300 and respond appropriately. In other words, if the extension is not supported by responder 220, the extension 300 is ignored and the rest of the echo request message 222A-C is processed conventionally. According to principles of the present disclosure, the extension 300 also has a number of fields 318-330 that the originator 210 and/or responder 220 can use to include measurements and/or parameters associated with the echo request message 222A-C, the echo response message 224A-C and/or associated with the probed GTP-U link itself. In the specific example of FIG. 4, the extension 300 contains a request exit timestamp field 318 used by the originator 210 for specifying an exit time for the echo request message, a request arrival timestamp field 320 used by the responder 220 for specifying an arrival time for the echo request message, a response exit timestamp field 322 used by the responder 220 for specifying an exit time for the echo response message.

The extension 300 also contains a request Differentiated Service Code Point (DSCP) field 324 and a Travel Length (TTL) field 326 used by the responder 220 used for specifying the DSCP and IPv4 or IPv6 hop count detected for the associated echo request message received. The extension 300 also contains a responder sequence number field 328 used by the responder 220 for specifying the sequence number of the echo responses according to their transmit order. In some implementations, the sequence starts at zero and is incremented by one by the responder 220 for each echo response message sent. In other implementations, the sequence number set by the responder 220 is generated independently from the sequence number associated with incoming echo request messages and set by the originator 210. Finally, the extension 330 contains a responder identifier field 330 that can be used by the responder to identify itself as the responder in the echo response message 224A-C.

It is important to note that the originator 210 and/or responder 220 may decide to use only a subset of the extension fields described above. For example, in some implementations, the extension fields set by the originator 210 are not included in the extension 300 contained in the echo request message(s) 222A-C. Similarly, in other implementations, the extension fields set by the responder 220 are not included in the extension 300 contained in the echo response message(s) 224A-C. Other possibilities exist for the extension 300 used by the originator 210 and responder 220.

It is also possible that in other implementations, new echo request and response messages which are different from conventional echo messages (e.g. identified by a different message type value) can be used to contain the originator request indication for a probing interval recommendation, the responder probing interval recommendation and/or any of the other extension fields populated by the originator 210 and/or responder 220 and described above in relation to FIG. 4.

Figure 5:
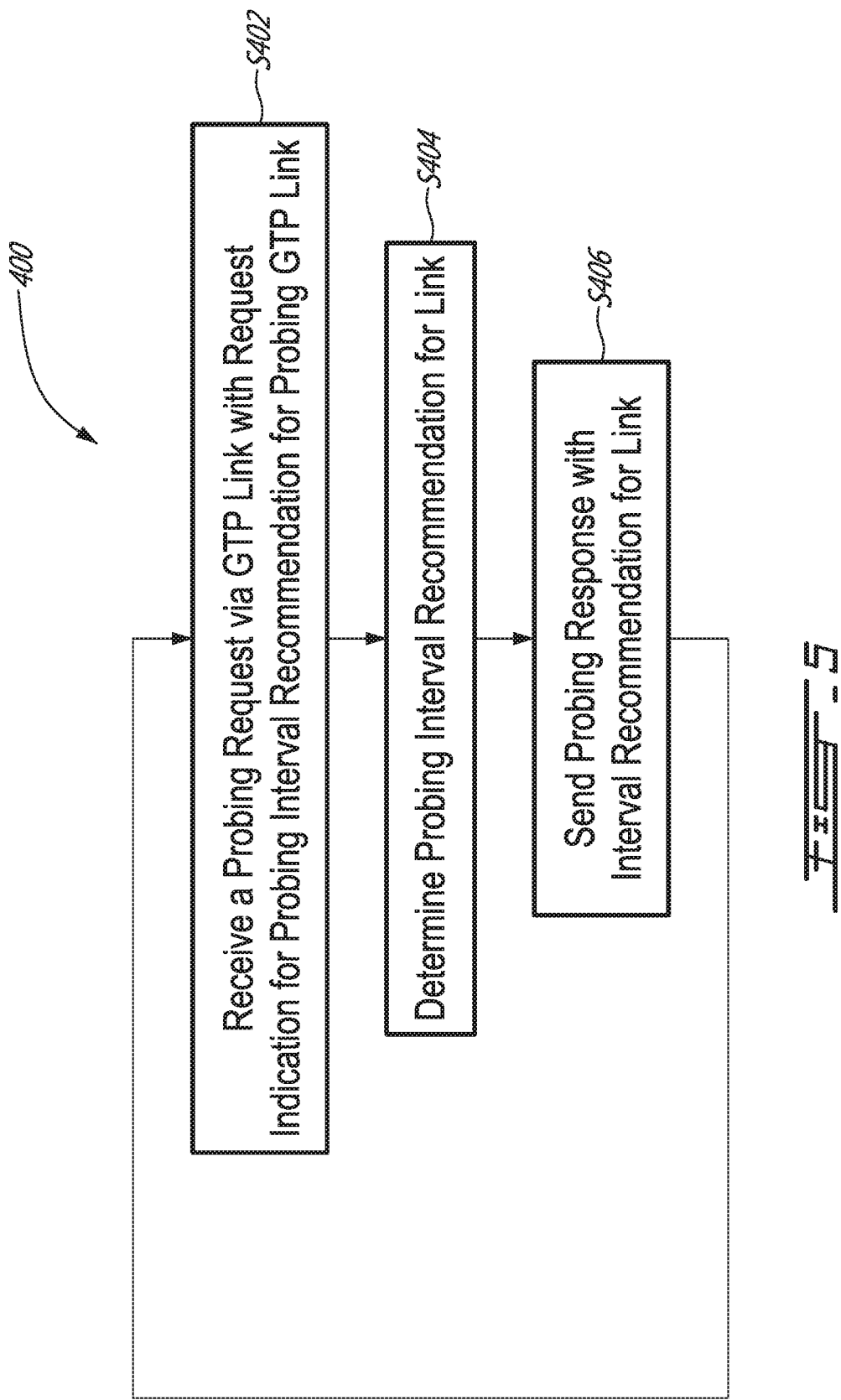
FIG. 5 is a flow chart example of a method for a responder network node for probing a GTP link with a peer node in the LTE network of FIG. 1 or 2, in accordance with the principles described herein.

Turning now to FIG. 5, there is shown a flow chart example of a method 400 for a network node for probing GTP links operable to carry data traffic between the network node and a peer node in the LTE network of FIG. 1 or 2, in accordance with the principles described herein. In this example, the network node is configured as a responder and the peer node is configured as an originator. The method 400 begins at step S402 where the network node (the responder) receives a probing request message from the peer node (the originator) via a GTP link where the probing request message contains a request indication for a probing interval recommendation for probing the GTP link. In response to the probing request message received, the responder network node determines at step S404 a probing interval recommendation for probing the GPT link. At step S406, the responder network node sends via the GTP link a probing response message to the originator peer node containing the probing interval recommendation determined at which point the method returns to step S402 when it receives another probing request message.

In some implementations, the method repeats itself every time a new probing request message is received from the originator peer node. In those implementations, the probing interval for probing the GTP link can be changed dynamically every time a new probing request message is received from the originator peer node to adapt the probing frequency to the prevailing conditions measured and/or capabilities available at the responder network node. In other implementations, the probing interval recommendation determination at step S404 is performed only for every $N^{th}$ probing request received. Other possibilities exit for dynamically adjusting the probing interval. A dynamic probing interval may be useful in implementations where, for example, the responder network node is subject to performance variations over time, either at the link level or at the node level. Also, by providing a mechanism to allow the responder network node to change its recommended probing interval dynamically, it may be possible for the responder network node to continuously take into consideration its current conditions and/or capabilities as the probing is performed and hence optimize the probing done such that it does not interfere with the responder network node's performance.

Figure 6:
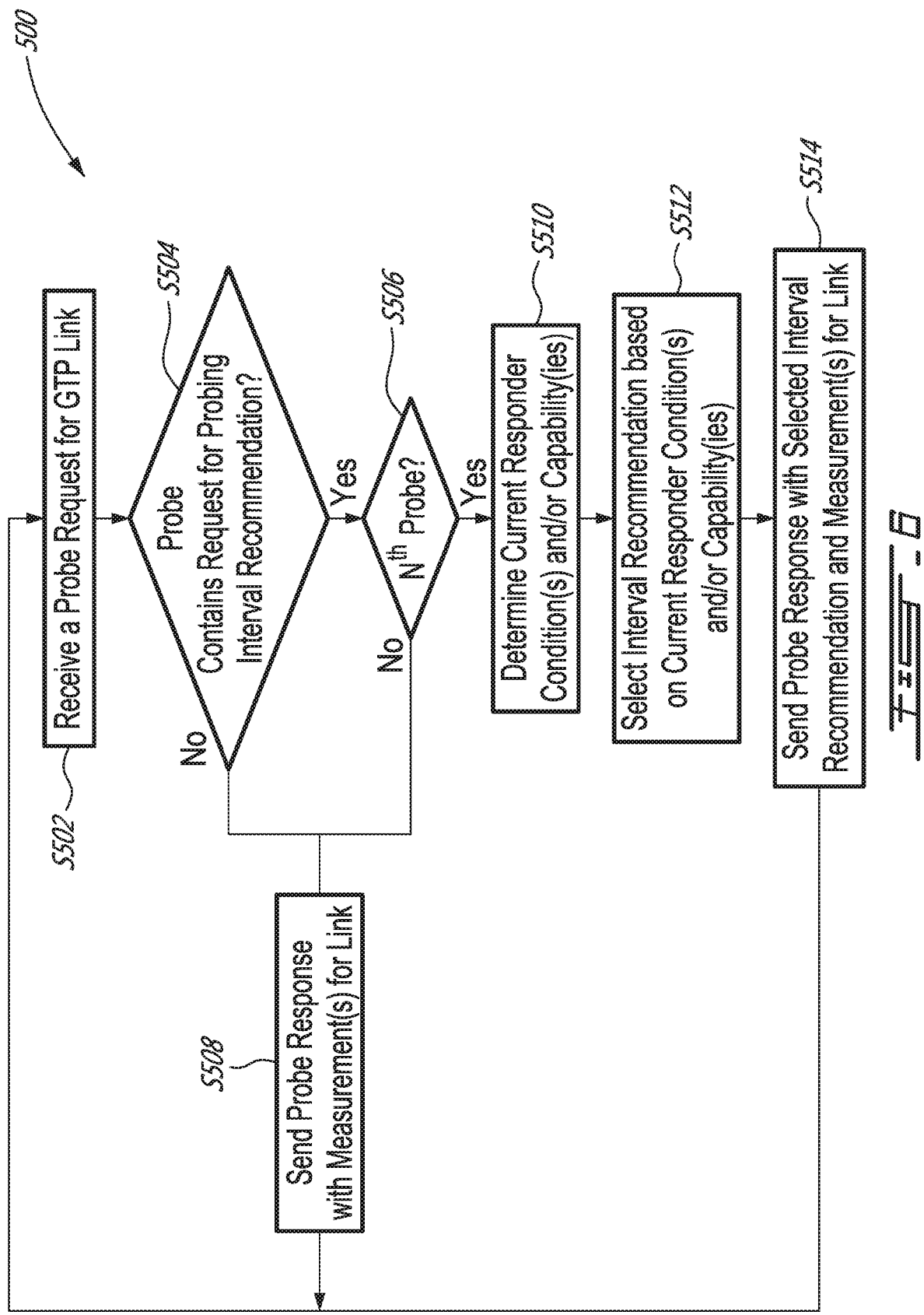
FIG. 6 is a flow chart example of another method for a responder network node for probing a GTP link with a peer node in the LTE network of FIG. 1 or 2, in accordance with the principles described herein.

FIG. 6 is a flow chart example of another method 500 for a network node configured for probing a GTP link with a peer node in a communication network (e.g. the LTE network of FIG. 1 or 2), in accordance with the principles described herein. In this example, the network node is configured as a responder and the peer node is configured as an originator. The method 500 begins at step S502 where the responder network node receives a probing request message (e.g. an echo/probe request) from the originator peer node for probing the GTP link. At step S504, the responder network node determines if the probe request contains a request for a probing interval recommendation. If a probing interval recommendation request not included, the responder network node proceeds to step S508 where it sends a probing response message (e.g. an echo/probe response) to the originator peer node that contains measurements and/or parameters associated with the probe request, the probe response and/or associated with the probed GTP link itself. If, alternatively, a probing interval recommendation request is included in the probe request, the responder network node determines at step S506 if the probe request received is the $N^{th}$ probe request (or the $N^{th}$ probe request with a probing interval request) received. The value of N may be selected based on how responsive the implementation needs to be. For example a large value of N may be useful in implementations where it is desirable to reduce and/or minimize changes to the probing interval. Alternatively, a small N may be useful in implementations where it is desirable to keep maintain close alignment between the probing and the conditions and/or capabilities prevailing at the responder network node. Example values for N include 1, 5, 10, 50, 100 but other possibilities exist for N.

If the probe request received is the $N^{th}$ probe request (or the $N^{th}$ probe request with a probing interval recommendation request) received, the responder network node evaluates (e.g. determines) at step S510 one or more of its conditions and/or capabilities currently prevailing either for the GTP link being probed and/or for the responder network node generally. Examples of current conditions and/or capabilities includes a congestion level, a number of probe requests previously processed or discarded, a CPU utilization level, a traffic level for the GTP link, a number of active or current GTP links, a type for the GTP link, etc.

At step S512, the responder network node selects a probing interval recommendation based on the current responder conditions and/or capabilities determined. In some implementations, the responder network node compares the condition(s) and/or capability (ies) evaluated against a defined value, threshold or range which, in some cases, may be preconfigured, predetermined or defined in a policy or configuration file. In one example, when the responder condition(s) and/or capability(ies) determined (e.g. a load associated with the GTP link or network node) is greater than a policy value, the responder network node selects a large interval which if adopted by the originator, would result in slower probing. When the current condition(s) and/or capability(ies) determined meets the policy value, the responder network node continues to select the same interval recommendation i.e. same as a previously selected interval recommendation). When the condition(s) and/or capability(ies) determined is lower than the policy value, the responder network node selects a small interval which, if adopted by the originator, would result in faster probing.

However, depending on the type of condition(s) and/or capabilities used for its probing interval recommendation, the responder network node may behave differently. For example, if the condition and/or capability is the throughput associated with the GTP link or network node, instead of selecting a large interval when the current throughput determined is greater than a policy value, the responder network node may do the opposite i.e. select a small interval to speed up the probing. Similarly, instead of selecting a small interval when the current throughput determined is lower than a policy value, the responder network node may select a large interval to slow down the probing. Also, instead of selecting the same interval when the current throughput determined meet the policy value, the responder network node may select a larger or smaller interval, for example, progressively over several probe requests, to optimize the probing until or unless the current throughput deteriorate beyond the policy value. Other implementations for the responder network node to select its recommended interval are possible.

At step S518, the responder network node sends via the GTP link a probing response (e.g. an echo/probe response) to the originator peer node containing the selected probing interval recommendation as well as measurements and/or parameters associated with the probe request, the probe response and/or associated with the probed GTP link itself. After, the method 500 returns to step S502 to handle the next probe request.

Similarly to the method 400 of FIG. 5, in some implementations, a dynamic probing interval may be useful in implementations where, for example, the responder network node is subject to performance variations over time, either at the link level or at the node level. Also, by providing a mechanism to allow the responder network node to change its recommended probing interval dynamically, it may be possible for the responder network node to continuously take into consideration its current conditions and/or capabilities as probing requests are received and hence optimize the probing done such that it does not interfere with the responder network node's performance.

In some implementations, the probing interval recommendation for a given link can be changed independently of probing interval used for other links. In those implementations, each of the methods described above in relation to FIG. 5 or 6 can be performed by the responder network node independently of any probing that might be done for other GTP links with the originator peer node or other originator peer nodes. For example, if also configured as responder for another GTP link terminated at another originator peer node, the network node might determine a probing interval recommendation for that other GTP link that might be different than the probing interval recommendation determined for the GTP link with the first originator peer node. Alternatively, if configured as an originator for that other GTP link, the network node might use a probing interval recommendation determined by the other peer node (configured as a responder node) which is different from the probing interval recommendation it determined as a responder for the first GTP link. Generally, in these implementations, the probing is link specific. In other words, for any given GTP link, the responder node determines its recommended probing interval and the originator node sets the final probing interval independently of any other GTP link they might terminate (either as originator or responder). With that approach, an originator node can advantageously tailor the probing of different GTP links based on, for example, the respective ability of the responder node to respond to probe requests and/or the type of GTP link (including the type of underlying interface over which the GTP link is established (e.g. S1-U, X2-U between eNBs or X2-U between a PPU eNB and a BBU eNB, or the M1 link between MBMS-GW and eNBs)).

Figure 7:
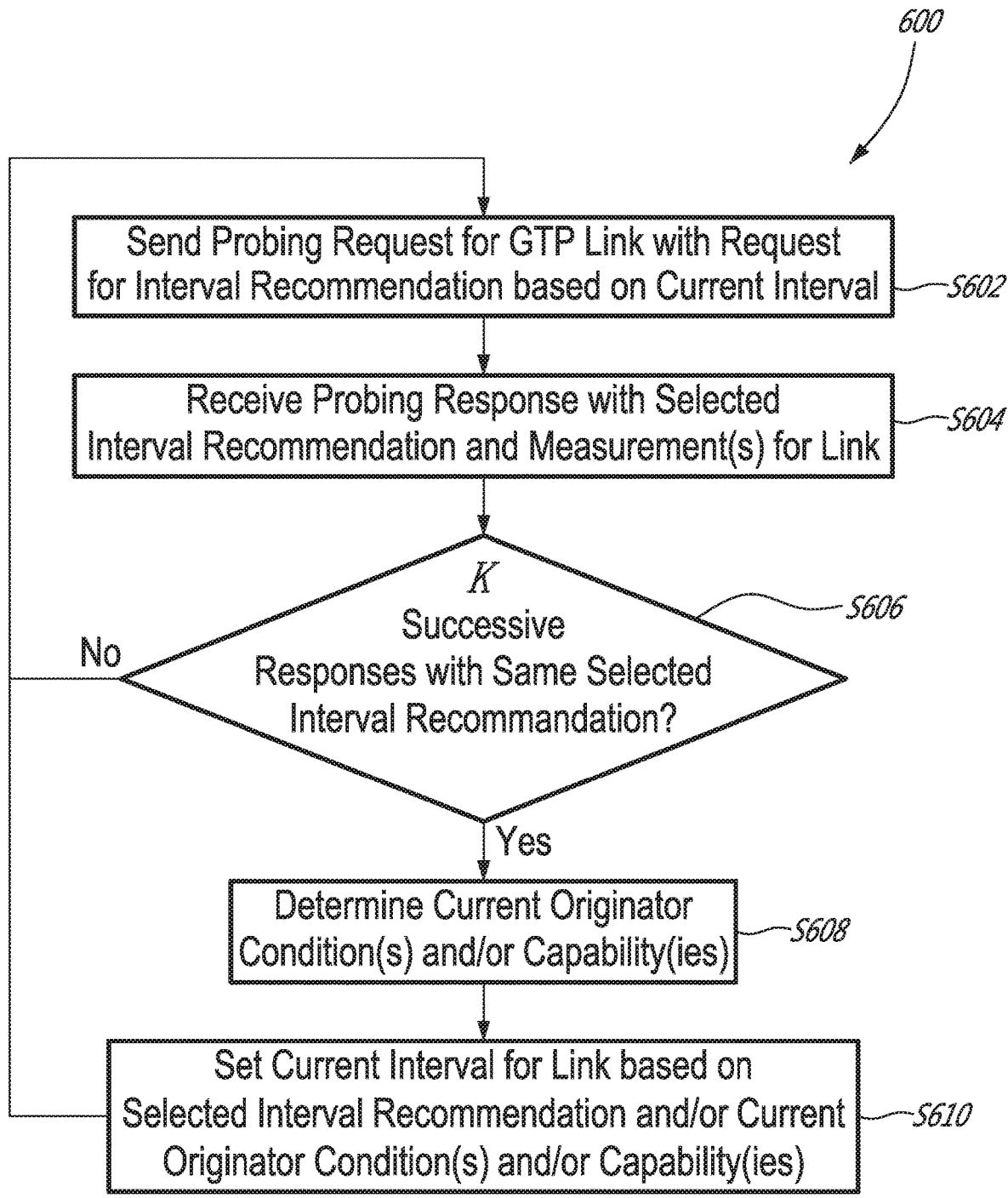
FIG. 7 is a flow chart example of a method for an originator network node for probing a GTP link with a peer node in the LTE network of FIG. 1 or 2, in accordance with the principles described herein.

FIG. 7 is a flow chart example of yet another method 600 for a network node for probing GTP links operable to carry data traffic between the network node and a peer node in the LTE network of FIG. 1 or 2, in accordance with the principles described herein. In this example, the network node is configured as an originator and the peer node is configured as a responder. The method 600 begins at step S602 where the originator network node sends a probing request message (e.g. an echo/probe request) to the responder peer node via a GTP link where the probing request message contains a request indication for a probing interval recommendation for probing the GTP link. The probing request message is sent at a time based on a current probing interval set by the originator network node. In response to the probing request message sent, the originator network node receives from the responder peer node via the GTP link a probing response message at step S604 that contains a probing interval recommendation determined by the responder peer node for probing the GPT link as well as measurements and/or parameters associated with the probing request message, the probing response message and/or associated with the probed GTP link itself. In some implementations, the originator network node may optionally wait to receive the same responder probing interval recommendation a number of times before setting a new value for the current probing interval (at step S610). In those implementations, the originator network node may determine at step S606 whether a (predetermined or configured) number K of successive probing response messages with the same responder probing interval recommendation has been received. Example values for K include 1, 3 and 5 but other values are possible. If the originator network node determines that the number K of successive probing responses has not been reached, the originator network node maintains the same value for its current probing interval and the method 600 returns to step S602 to send the next probing request at a time based on the unchanged (current) interval value.

If, on the other hand, the originator network node determines that a (predetermined or configured) number K of successive probing response messages with the same responder probing interval recommendation has been received, the originator network node then evaluates (e.g. determines) at step S608 one or more of its conditions and/or capabilities currently prevailing for the GTP link being probed and/or for the originator network node generally. Examples of current originator conditions and/or capabilities includes a congestion level, a number of probe requests transmitted per second, a CPU utilization level, a traffic level for the GTP link, the type of GTP link/underlying interface over which the GTP link is established (e.g. S1-U, X2-U between eNBs or X2-U between a PPU eNB and a BBU eNB or M1 between MBMS-GW and eNBs), a number of active or current GTP links, etc.

At step S610, the originator network node sets the current probing interval for the GTP link based on the responder probing interval recommendation and the originator's current condition(s) and/or capability(ies) and the method returns to step S602 to send the next probing request at a time based on the current interval set. In some implementations, the originator network node sets the current probing interval at step S610 to a value greater or equal to the responder probing interval recommendation, based on its current originator condition(s) and/or capability(ies). In other implementations, the originator network nodes sets the current probing interval to be the largest of the responder probing interval recommendation and a probing interval value the originator can handle based on the its current condition(s) and/or capability(ies). Advantageously in those implementations, the current probing interval can be set dynamically such that the probing for any given link can be handled by both the originator and responder, including the one with the weaker performance or under the more difficult constraints. Other methods for setting the current probing interval at the originator network node are possible.

In some implementations, a counter k can be used to track the number of successive probing responses received with the same probing interval recommendation. In those implementations, the counter is incremented by one (e.g. in step S604) after each probing response received with the same probing interval recommendation value) and is reset to a value of zero after the number K of successive probing responses received with the same probing interval recommendation value has been reached (e.g. yes branch of step S606 or in S608) or when a new probing interval recommendation value has been received before K successive probing responses were received with the same probing interval recommendation value. Other possibilities exist for keeping track of the number of successive probing responses received with the same probing interval recommendation. In other implementations, the method repeats itself for every new probing request message sent to the responder peer node. In those implementations, the probing interval can be changed dynamically every time K successive probing response messages containing the same new probing interval recommendation value are received from the responder peer node. As noted above, in some implementations, the probing interval recommendation value received may be based on current conditions and/or capabilities available at the responder peer node.

In some implementations, additional or different steps to those shown in FIG. 7 may be performed by the originator network node. In one implementation, the originator network node performs the method 600 after it has determined the responder peer node is reachable or available, for example, by determining that at least a predetermined number (e.g. three) of probing responses has been received and/or the responder peer node status has changed from unreachable to reachable. In another implementation, the originator network node sets a default or initial value for its current probing interval before it performs the method 600. In yet another implementation, at step S608, the originator network node sets its current interval value based on the probing interval value recommended by the responder peer node but also its own current condition(s) and/or capability(ies). In yet another implementation, the originator network node sets its current interval to the largest of the probing interval recommendation received from the peer node and the probing interval that the originator network node itself can handle based on its own condition(s) and/or capability(ies). In yet another implementation, the originator network node makes the final determination of what the current probing interval should be for subsequent probing requests.

In some implementations, the probing interval used by the originator network node for a given link can be changed independently of probing intervals used for other links. In those implementations, the method 600 described above in relation to FIG. 7 can be performed by the originator network node independently of any probing that might be done for other GTP links with the responder peer node or other responder peer nodes. For example, if also configured as an originator for another GTP link terminated at another responder peer node, the originator network node might set a probing interval for that other GTP link that might be different than the probing interval set for the GTP link with the first responder peer node as the recommended probing intervals from the responder peer nodes might be different. Alternatively, if configured as a responder for that other GTP link, the network node might instead provide a probing interval recommendation to the other peer node (configured as an originator) that is different than the one it might use for the first GTP link. Generally, in these implementations, the probing is link specific and with that approach, an originator node can advantageously tailor the probing of different GTP links based on, for example, the respective ability of the responder node to respond to probe requests, the type of GTP link/underlying interface over which the GTP link is established (e.g. S1-U, X2-U between eNBs or X2-U between a PPU eNB and a BBU eNB or M1 between MBMS-GW and eNBs).

FIGS. 8A-B are block diagrams of exemplary embodiments of network nodes 1000, 1100 configured respectively as originator and responder nodes (e.g. such as those described in relation to FIGS. 1-7 above) for probing GTP links with peer nodes in accordance with the principles of the present disclosure.

As illustrated in FIG. 8A, originator network node 1000 includes a transceiver 1002, one or more processor(s) 1004, and memory 1006 which includes an interval setting module 1008. In one embodiment, the transceiver 1002 may be replaced by a transmitter and a receiver (not shown). The transceiver 1002 is configured to perform the sending and receiving functionality described above for an originator node which, as noted above includes sending to a peer node via a GTP link a probing request message containing a request indication for a probing interval recommendation for probing the GTP link and receiving from the peer node a probing response message containing a probing interval recommendation determined by the peer node. The interval setting module 1008 is configured to perform the interval setting functionality described above in relation to an originator node, which includes setting a current probing interval based on the probing interval recommendation determined by the peer node.

The interval setting module 1008 is implemented at least partially in the memory 1006 in the form of software or (computer-implemented) instructions executed by the processor(s) 1004 within the originator network node 1000 or distributed across two or more nodes (e.g., the originator network node 1000 and another node). In another example, the sending and receiving functionality described above in relation to an originator node is instead implemented in the form of software or (computer-implemented) instructions executed by the processor(s) 1004 in combination with the transceiver 1002 within the originator network node 1000 or distributed across two or more nodes (e.g., the network node 1000 and another node). In yet another example, the processor(s) 1004 includes one or more hardware components (e.g., Application Specific Integrated Circuits (ASICs)) that provide some or all of the sending, receiving and interval setting functionality described above. In another embodiment, the processor(s) 1004 include one or more hardware components (e.g., Central Processing Units (CPUs)), and some or all of the sending, receiving and/or interval setting functionality described above is implemented in software stored in, e.g., the memory 1006 and executed by the processor 1004 in combination with the transceiver 1002. In yet another embodiment, the processor(s) 1004 and memory 1006 form processing means (not shown) configured to perform the sending, receiving and/or interval setting functionality described above.

As illustrated in FIG. 9B, responder network node 1100 includes a transceiver 1102, one or more processor(s) 1104, and memory 1106 which includes an interval determining module 1108. In one embodiment, the transceiver 1102 may be replaced by a transmitter and a receiver (not shown). The transceiver 1102 is configured to perform the receiving and sending functionality described above for an responder node which, as noted above includes receiving from a peer node via a GTP link a probing request message containing a request indication for a probing interval recommendation for probing the GTP link and sending to the peer node a probing response message containing a probing interval recommendation determined by the responder network node 1100. The interval recommendation determining module 1108 is configured to perform the interval recommendation determining functionality described above in relation to a responder node, which includes determining a probing interval recommendation for probing the GTP link.

The interval recommendation determining module 1108 is implemented at least partially in the memory 1106 in the form of software or (computer-implemented) instructions executed by the processor(s) 1104 within the responder network node 1100 or distributed across two or more nodes (e.g., the responder network node 1100 and another node). In another example, the receiving and sending functionality described above in relation to a responder node is instead implemented in the form of software or (computer-implemented) instructions executed by the processor(s) 1104 in combination with the transceiver 1102 within the responder network node 1100 or distributed across two or more nodes (e.g., the responder network node 1100 and another node). In yet another example, the processor(s) 1104 includes one or more hardware components (e.g., Application Specific Integrated Circuits (ASICs)) that provide some or all of the receiving, sending and/or interval recommendation determining functionality described above. In another embodiment, the processor(s) 1104 include one or more hardware components (e.g., Central Processing Units (CPUs)), and some or all of the receiving, sending and/or interval recommendation determining functionality described above is implemented in software stored in, e.g., the memory 1106 and executed by the processor 1004 in combination with the transceiver 1102. In yet another embodiment, the processor(s) 1104 and memory 1106 form processing means (not shown) configured to perform the receiving, sending and/or interval recommendation determining functionality described above.

FIGS. 9A-B show a variant for each of the originator and responder network node examples of FIGS. 8A-B, denoted respectively as originator access node 1200, and responder network node 1300. Each of the nodes 1200, 1300 includes a transceiver 1202, 1302 and circuitry containing (computer-implemented) instructions which when executed by one or more processor(s) 1204, 1300 cause their respective node 1200, 1300 to perform some or all of their respective sending, receiving, interval setting/interval recommendation determining functionality described above. In yet another variant, the circuitry includes the respective memory 1206, 1306 and processor(s) 1204, 1304 which, similarly to the example originator and responder network nodes 1000, 1100 of FIGS. 8A-B may be implemented in many different ways. In one example, the memories 1206, 1306 contain instructions which, when executed, cause the respective nodes 1200, 1300 to perform some or all of their respective sending, receiving, interval setting/interval recommendation determining functionality described above. Other implementations are possible.

Other Embodiments

The following is also noted in accordance with other contemplated embodiments.

According to a broad aspect, there is provided a method for a network node for probing GTP links operable to carry data traffic between the network node and peer nodes in a communication network. The method includes at the network node receiving a probing request message originating from a first peer node via a GTP link where the probing request message contains a request indication for a probing interval recommendation for probing the GTP link. The method also includes in response to the probing request message received, determining a probing interval recommendation for probing the GTP link. The method also includes sending a probing response message to the first peer node via the GTP link where the probing response message contains the probing interval recommendation.

In some embodiments, sending a probing response message includes sending a number of successive probing response messages to the first peer node where each successive probing response message contains the probing interval recommendation determined. In other embodiments, the probing response message contains at least one parameter associated with one of the probing request message, the probing response message and the GTP link.

In yet other embodiments, the probing interval recommendation is a current probing interval and the method further includes receiving a subsequent probing request message originating from the first peer node via the GTP link where the subsequent probing request message contains a request indication for a probing interval recommendation for probing the GTP link. In these embodiments, in response to the subsequent probing request message received, the method further includes determining a subsequent probing interval recommendation for probing the GTP link where the second probing interval recommendation is different from the current probing interval. The method also includes sending a subsequent probing response message to the first peer node via the GTP link where the subsequent probing response contains the subsequent probing interval recommendation. In yet other embodiments, the method further includes repeating the acts of receiving, determining and sending for each of a plurality of probing request messages received from the first peer node.

In yet other embodiments, the probing interval recommendation is a first probing interval recommendation and the GTP link is a first GTP link, and the method further includes receiving a probing request message originating from a second peer node via a second GTP link where the probing request message from the second peer node contains a request indication for a probing interval recommendation for probing the second GTP link. In these embodiments, the method further includes in response to the probing request received from the second peer node, determining a second probing interval recommendation for probing the second GTP link where the second probing interval recommendation is determined independently of the first probing interval recommendation. The method further includes sending a probing response message to the second peer node via the second GTP link where the probing response message for the second peer node contains the second probing interval recommendation. In yet other embodiments, the method further includes repeating the acts of receiving, determining and sending for probing the second GTP link with the second peer node for each of a plurality of probing request messages received from the second peer node.

In yet other embodiments, determining a probing interval recommendation for probing the GTP link includes determining a probing interval recommendation based on at least one of a condition at the network node and a capability of the network node. In yet other embodiments, determining a probing interval recommendation for probing the GTP link includes determining a probing interval recommendation based on least one of a capability of the network node, a congestion level at the network node, a number of probe messages processed at the network node, a CPU utilization level at the network node, a traffic level for the GTP link, a type for the GTP link, and a number of current GTP links at the network node. In yet other embodiments, the GTP link comprises one of a GTP path, one or more GTP tunnels, one or more GTP-U tunnels and one or more GTP-C tunnels.

In yet other embodiments, the probing request message includes a GTP-U Echo request and the probing response message includes a GTP-U Echo response and wherein the probing interval recommendation is included in one of an Information Element and a private extension of the GTP-U Echo response. In yet other embodiments, the probing request message includes a TWAMP Session-Sender test packet and the probing response message includes a TWAMP Session-Reflector test packet and wherein the probing interval recommendation is included in a field of the TWAMP Session-Reflector packet.

In yet other embodiments, the request indication for a probing interval recommendation for probing the GTP link includes one of a flag, a private extension, a current probing interval value, a current probing method value, and a probing interval Information Element. In yet other embodiments, the probing interval recommendation includes one of a probing interval value and a probing method value indicative of a probing interval value.

In another broad aspect, there is provided another method for a network node for probing GTP links operable to carry data traffic between the network node and peer nodes in a communication network. The method includes at the network node sending a probing request message to a first peer node via a GTP link where the probing request message contains a request indication for a probing interval recommendation for probing the GTP link. The method further includes receiving a probing response message from the first peer node via the GTP link where the probing response message contains a probing interval recommendation determined by the first peer node.

In some implementations, the method further includes setting a probing interval for the GTP link based on the probing interval recommendation determined by the first peer node. In other embodiments, the method further includes setting a probing interval for the GTP link based on the probing interval recommendation determined by the first peer node and at least one of a condition at the network node and a capability of the network node. In yet other embodiments, the method further includes setting a probing interval for the GTP link based on the probing interval recommendation determined by the first peer node and at least one of a capability of the network node, a congestion level at the network node, a number of probe messages processed at the network node, a CPU utilization level at the network node, a traffic level for the GTP link, a type for the GTP link, and a number of current GTP links at the network node.

In some implementations, the method further includes sending a subsequent probing request message to the first peer node via the GTP link at a time based on the probing interval set. In other implementations, the method further includes sending a subsequent probing request message to the first peer node via the GTP link at a time based on the probing interval set, after receiving a number of successive probing response messages from the first peer node. In other implementations, the probing response message contains at least one parameter associated with one of the probing request message, the probing response message and the GTP link.

In yet other implementations, the probing interval recommendation contained in the probing response message is a first probing interval recommendation and the method further includes sending a subsequent probing request message to the first peer node via the GTP link where the subsequent probing request message contains a request indication for a probing interval recommendation for probing the GTP link. In those implementations, the method further includes receiving a subsequent probing response message from the first peer node via the GTP link where the subsequent probing response message contains a subsequent probing interval recommendation determined by the first peer node and different from the first probing interval recommendation. In yet other implementations, the method further includes repeating the acts of sending a probing request message to the first peer node and receiving a probing response message from the first peer node based on the probing interval recommendation contained in the probing response message.

In yet other implementations, the probing interval recommendation contained in the probing response message is a first probing interval recommendation and the GTP link is a first GTP link and the method further includes sending a probing request message to a second peer node via a second GTP link wherein the probing request message to the second peer node contains a request indication for a probing interval recommendation for probing the second GTP link. The method further includes receiving a probing response message from the second peer node via the second GTP link where the probing response message from the second peer node contains a second probing interval recommendation determined by the second peer node independently of the first probing interval recommendation. In yet other implementations, the method further includes repeating the acts of sending and receiving for probing the second GTP link with the second peer node based on the second probing interval recommendation.

In yet other implementations, the probing interval recommendation is determined based on at least one of a capability of the first peer node, a congestion level at the first peer node, a number of probe messages processed at the first peer node, a CPU utilization level at the first peer node, a traffic level for the GTP link, a type for the GTP link, and a number of current GTP links at the first peer node. In yet other implementations, the GTP link comprises one of a GTP path, one or more GTP tunnels, one or more GTP-U tunnels and one or more GTP-C tunnels. In yet other implementations, the probing request message includes a GTP-U Echo request and the probing response message includes a GTP-U Echo response and wherein the probing interval recommendation determined is included in one of an Information Element and a private extension of the GTP-U Echo response. In yet other implementations, the probing request message includes a TWAMP Session-Sender test packet and the probing response message includes a TWAMP Session-Reflector test packet and wherein the probing interval recommendation determined is included in a field of the TWAMP Session-Reflector packet. In yet other implementations, the request indication for a probing interval recommendation for probing the GTP link includes one of a flag, a private extension, current probing interval value, a current probing method value, and a probing interval Information Element. In yet other implementations, the probing interval recommendation determined includes one of a probing interval value and a probing method value indicative of a probing interval value.

In another broad aspect, there is provided a network node configured to probe GTP links operable to carry data traffic between the network node and peer nodes in a communication network, where the network node includes circuitry containing instructions which, when executed, cause the network node to perform any of the method embodiments described above. In some embodiments, the network node includes a radio access node (e.g. an eNodeB or WLAN Access Point) or an S-GW node.

In yet another broad aspect, there is provided a non-transitory computer readable memory configured to store executable instructions for a network node and where the network node is configured to probe GTP links operable to carry data traffic between the network node and peer nodes in a communication network, and where the executable instructions when executed by a processor cause the network node to implement any of the above method embodiments described above.

In yet another broad aspect, there is provided a network node configured to probe GTP links operable to carry data traffic between the network node and peer nodes in a communication network, where the network node includes a receiver for receiving a probing request message originating from a first peer node via a GTP link where the probing request message contains a request indication for a probing interval recommendation for probing the GTP link. The network node also includes an interval recommendation determining module for determining a probing interval recommendation for probing the GTP link in response to the probing request message received. The network node also includes a transmitter for sending a probing response message to the first peer node via the GTP link where the probing response message contains the probing interval recommendation determined.

In yet another broad aspect, there is provided a network node configured to probe GTP links operable to carry data traffic between the network node and peer nodes in a communication network, where the network node includes a transmitter for sending a probing request message to a first peer node via a GTP link, where the probing request message contains a request indication for a probing interval recommendation for probing the GTP link. The network node also includes a receiver for receiving a probing response message from the first peer node via the GTP link, where the probing response message contains the probing interval recommendation determined by the first peer node. In some implementations, the network node also includes an interval setting module for setting a current probing interval based on the probing interval recommendation determined by the first peer node.

It will be appreciated by persons skilled in the art that the principles described herein are not limited to what has been particularly shown and described herein above. In addition, unless mention was made above to the contrary, it should be noted that all of the accompanying drawings are not to scale. A variety of modifications and variations are possible in light of the above teachings which are limited only by the following claims.

The invention claimed is:

1. A method for a network node for probing General Packet Radio System (GPRS) Tunneling Protocol (GTP) links operable to carry data traffic between the network node and peer nodes in a communication network, the method comprising at the network node:
    receiving a probing request message originating from a first peer node via a GTP link, the probing request message containing a request indication for a probing interval recommendation for probing the GTP link;
    in response to the probing request message received, determining a probing interval recommendation for probing the GTP link, wherein the probing interval recommendation comprises one of a probing interval value and a probing method value indicative of a probing interval value; and sending a probing response message to the first peer node via the GTP link, the probing response message containing the probing interval recommendation.

2. The method of claim 1 wherein the probing response message contains at least one parameter associated with one of the probing request message, the probing response message and the GTP link.

3. The method of claim 1 wherein the probing interval recommendation is a current probing interval recommendation, the method further comprising:
receiving a subsequent probing request message originating from the first peer node via the GTP link, the subsequent probing request message containing a request indication for a probing interval recommendation for probing the GTP link;
in response to the subsequent probing request message received, determining a subsequent probing interval recommendation for probing the GTP link, the subsequent probing interval recommendation being different from the current probing interval recommendation; and
sending a subsequent probing response message to the first peer node via the GTP link, the subsequent probing response containing the subsequent probing interval recommendation.

4. The method of claim 1 wherein the probing interval recommendation is a first probing interval recommendation and the GTP link is a first GTP link, the method further comprising:
receiving a probing request message originating from a second peer node via a second GTP link, the probing request message from the second peer node containing a request indication for a probing interval recommendation for probing the second GTP link;
in response to the probing request received from the second peer node, determining a second probing interval recommendation for probing the second GTP link, the second probing interval recommendation being determined independently of the first probing interval recommendation; and
sending a probing response message to the second peer node via the second GTP link, the probing response message for the second peer node containing the second probing interval recommendation.

5. The method of claim 1 wherein determining a probing interval recommendation for probing the GTP link comprises determining a probing interval recommendation based on at least one of a capability of the network node, a congestion level at the network node, a number of probe messages processed at the network node, a CPU utilization level at the network node, a traffic level for the GTP link, a type for the GTP link, and a number of current GTP links at the network node.

6. The method of claim 1 wherein the GTP link comprises one of a GTP path, one or more GTP tunnels, one or more GTP-U tunnels and one or more GTP-C tunnels.

7. The method of claim 1 wherein the probing request message comprises a GTP-U Echo request and the probing response message comprises a GTP-U Echo response and wherein the probing interval recommendation is included in one of an Information Element and a private extension of the GTP-U Echo response.

8. The method of claim 1 wherein the probing request message comprises a Two-Way Active Measurement Protocol (TWAMP) Session-Sender test packet and the probing response message comprises a TWAMP Session-Reflector test packet and wherein the probing interval recommendation is included in a field of the TWAMP Session-Reflector packet.

9. The method of claim 1 wherein the request indication for a probing interval recommendation for probing the GTP link comprises one of a flag, a private extension, a current probing interval value, a current probing method value, and a probing interval Information Element.

10. A network node configured to probe General Packet Radio System (GPRS) Tunneling Protocol (GTP) links operable to carry data traffic between the network node and peer nodes in a communication network, the network node comprising circuitry containing instructions which, when executed, cause the network node to:
receive a probing request message originating from a first peer node via a GTP link, the probing request message containing a request indication for a probing interval recommendation for probing the GTP link;
in response to the probing request message received, determine a probing interval recommendation for probing the GTP link, wherein the probing interval recommendation comprises one of a probing interval value and a probing method value indicative of a probing interval value; and
send a probing response message to the first peer node via the GTP link, the probing response message containing the probing interval recommendation.

11. The network node of claim 10 wherein the probing response message contains at least one parameter associated with one of the probing request message, the probing response message and the GTP link.

12. The network node of claim 10 wherein the probing interval recommendation is a current probing interval recommendation, the instructions being further configured to cause the network node to:
receive a subsequent probing request message originating from the first peer node via the GTP link, the subsequent probing request message containing a request indication for a probing interval recommendation for probing the GTP link;
in response to the subsequent probing request message received, determine a subsequent probing interval recommendation for probing the GTP link, the subsequent probing interval recommendation being different from the current probing interval recommendation; and
send a subsequent probing response message to the first peer node via the GTP link, the subsequent probing response containing the subsequent probing interval recommendation.

13. The network node of claim 10 wherein the probing interval recommendation is a first probing interval recommendation and the GTP link is a first GTP link, the instructions being further configured to cause the network node to:
receive a probing request message originating from a second peer node via a second GTP link, the probing request message from the second peer node containing a request indication for a probing interval recommendation for probing the second GTP link;
in response to the probing request received from the second peer node, determine a second probing interval recommendation for probing the second GTP link, the second probing interval recommendation being determined independently of the first probing interval recommendation; and send a probing response message to the second peer node via the second GTP link, the probing response message for the second peer node containing the second probing interval recommendation.

14. The network node of claim 10 wherein to determine a probing interval recommendation for probing the GTP link, the instructions are further configured to cause the network node to determine a probing interval recommendation based on at least one of a capability of the network node, a congestion level at the network node, a number of probe messages processed at the network node, a CPU utilization level at the network node, a traffic level for the GTP link, a type for the GTP link, and a number of current GTP links at the network node.

15. The network node of claim 10 wherein the GTP link comprises one of a GTP path, one or more GTP tunnels, one or more GTP-U tunnels and one or more GTP-C tunnels.

16. The network node of claim 10 wherein the probing request message comprises a GTP-U Echo request and the probing response message comprises a GTP-U Echo response and wherein the probing interval recommendation is included in one of an Information Element and a private extension of the GTP-U Echo response.

17. The network node of claim 10 wherein the probing request message comprises a Two-Way Active Measurement Protocol (TWAMP) Session-Sender test packet and the probing response message comprises a TWAMP Session-Reflector test packet, and wherein the probing interval recommendation is included in a field of the TWAMP Session-Reflector packet.

18. The network node of claim 10 wherein the request indication for a probing interval recommendation for probing the GTP link comprises one of a flag, a private extension, a current probing interval value, a current probing method value, and a probing interval Information Element.

19. A non-transitory computer readable memory configured to store executable instructions for a network node, the network node configured to probe General Packet Radio System (GPRS) Tunneling Protocol (GTP) links operable to carry data traffic between the network node and peer nodes in a communication network, the executable instructions when executed by a processor cause the network node to:
receive a probing request message originating from a first peer node via a GTP link, the probing request message containing a request indication for a probing interval recommendation for probing the GTP link;
in response to the probing request message received, determine a probing interval recommendation for probing the GTP link, wherein the probing interval recommendation comprises one of a probing interval value and a probing method value indicative of a probing interval value; and
send a probing response message to the first peer node via the GTP link, the probing response message containing the probing interval recommendation.

\* \* \* \* \*